United States Patent
Platon et al.

(10) Patent No.: US 12,428,340 B2
(45) Date of Patent: Sep. 30, 2025

(54) PROCESS FOR ADJUSTING THE AMOUNT OF DILUTION WATER OF A BINDING COMPOUND, AND CORRESPONDING COMPUTING UNIT

(71) Applicant: SAINT-GOBAIN ISOVER, Courbevoie (FR)

(72) Inventors: Diana Platon, Compiegne (FR); Frédéric D'Herin Bytner, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 1079 days.

(21) Appl. No.: 17/416,262

(22) PCT Filed: Dec. 19, 2019

(86) PCT No.: PCT/EP2019/086377
§ 371 (c)(1),
(2) Date: Jun. 18, 2021

(87) PCT Pub. No.: WO2020/127784
PCT Pub. Date: Jun. 25, 2020

(65) Prior Publication Data
US 2022/0055944 A1 Feb. 24, 2022

(30) Foreign Application Priority Data

Dec. 21, 2018 (FR) ...................................... 1873729

(51) Int. Cl.
*C03C 25/146* (2018.01)
*C03C 25/1095* (2018.01)
(Continued)

(52) U.S. Cl.
CPC ........ *C03C 25/146* (2013.01); *C03C 25/1095* (2013.01); *C03C 25/24* (2013.01); *D04H 1/4226* (2013.01); *D04H 1/655* (2013.01)

(58) Field of Classification Search
CPC ... C03C 25/146; C03C 25/1095; C03C 25/24; D04H 1/4226
(Continued)

(56) References Cited

U.S. PATENT DOCUMENTS

2009/0007644 A1* 1/2009 Freeman ............... C03C 25/323
73/73

FOREIGN PATENT DOCUMENTS

JP   JP S60-173153 A    9/1985
JP   JP 2008-507466 A   3/2008
(Continued)

OTHER PUBLICATIONS

Office Action as issued in Japanese Patent Application No. 2021-535180, dated Oct. 31, 2023.
(Continued)

*Primary Examiner* — S. Behrooz Ghorishi
*Assistant Examiner* — Gregory C. Grosso
(74) *Attorney, Agent, or Firm* — Pillsbury Winthrop Shaw Pittman LLP

(57) ABSTRACT

A process for manufacturing a mat of mineral fibers, wherein fibers are formed and a binding compound resulting from the mixture of a binder composition with dilution water is applied on the fibers, the fibers impregnated with the binding compound are collected on a perforated receiving device equipped with a fiber-receiving surface and, below the surface, at least one suction duct, and the mat is heat treated. The process includes determining an optimal amount of dilution water as a function of the humidity of the air in the fiberizing station, of the humidity of the intake air and of the intake air flow rate in the at least one suction duct, and of the desired amount of water in the mat at the outlet of the receiving chamber, and adjusting the amount of dilution water as a function of the optimal amount thus determined.

17 Claims, 3 Drawing Sheets

(51) Int. Cl.
*C03C 25/24* (2018.01)
*D04H 1/4226* (2012.01)
*D04H 1/655* (2012.01)

(58) Field of Classification Search
USPC .......................................................... 156/64
See application file for complete search history.

(56) References Cited

FOREIGN PATENT DOCUMENTS

| JP | 2014-505003 A | 2/2014 | |
|---|---|---|---|
| WO | WO 2006/023137 A2 | 3/2006 | |
| WO | WO-2012078740 A1 * | 6/2012 | ............... B05D 1/02 |

OTHER PUBLICATIONS

International Search Report as issued in International Patent Application No. PCT/EP2019/086377, dated Feb. 20, 2020.

* cited by examiner

[Fig.1]
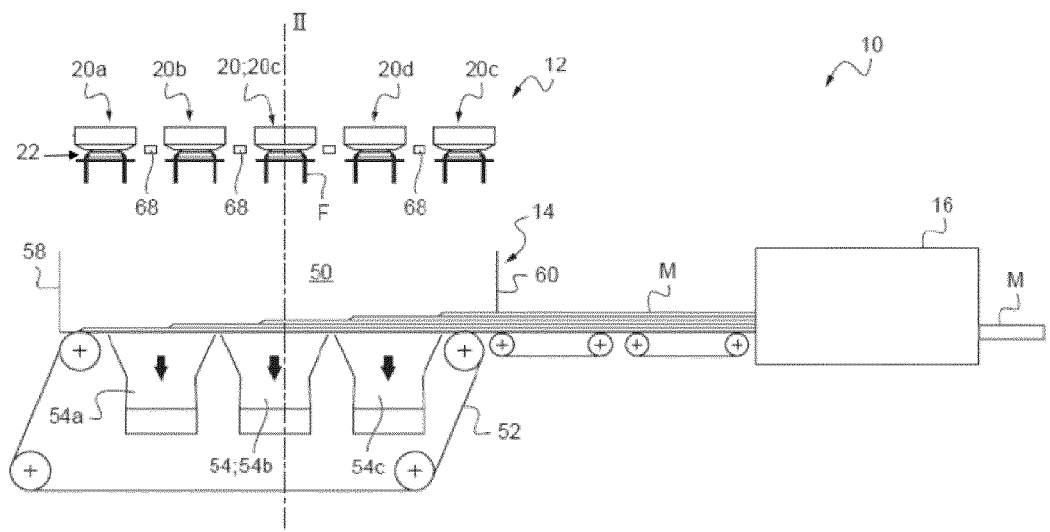

[Fig.2A]
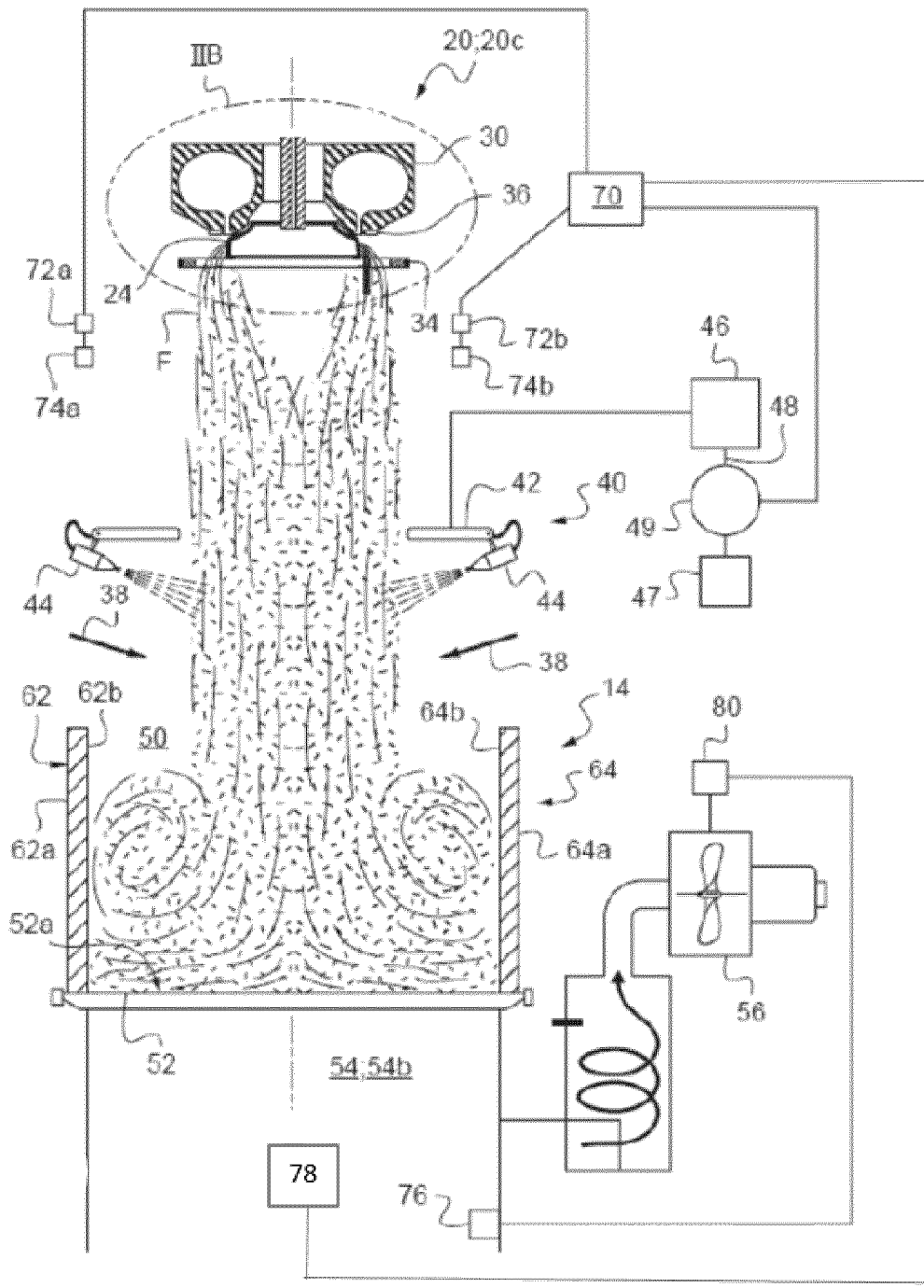

[Fig.2B]
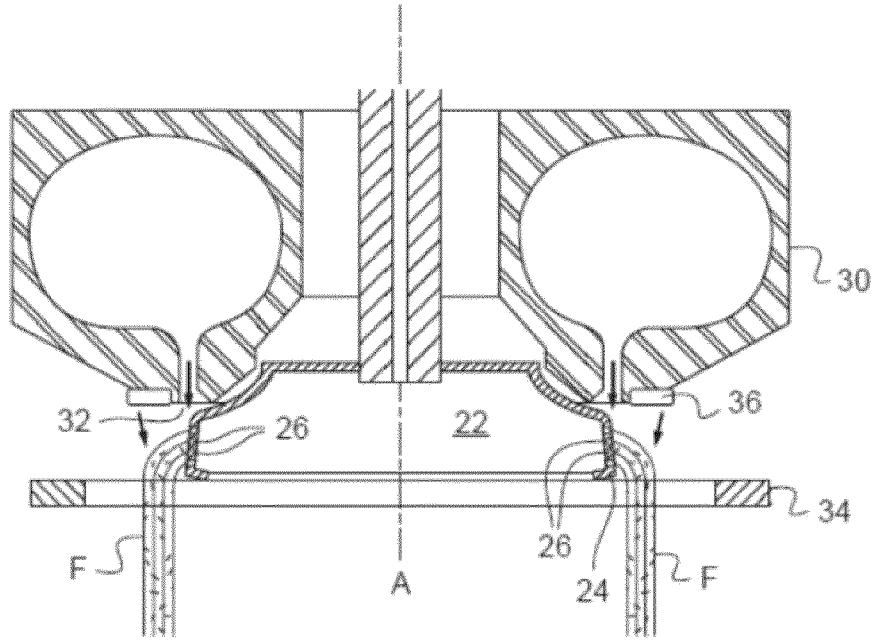
[Fig.3]
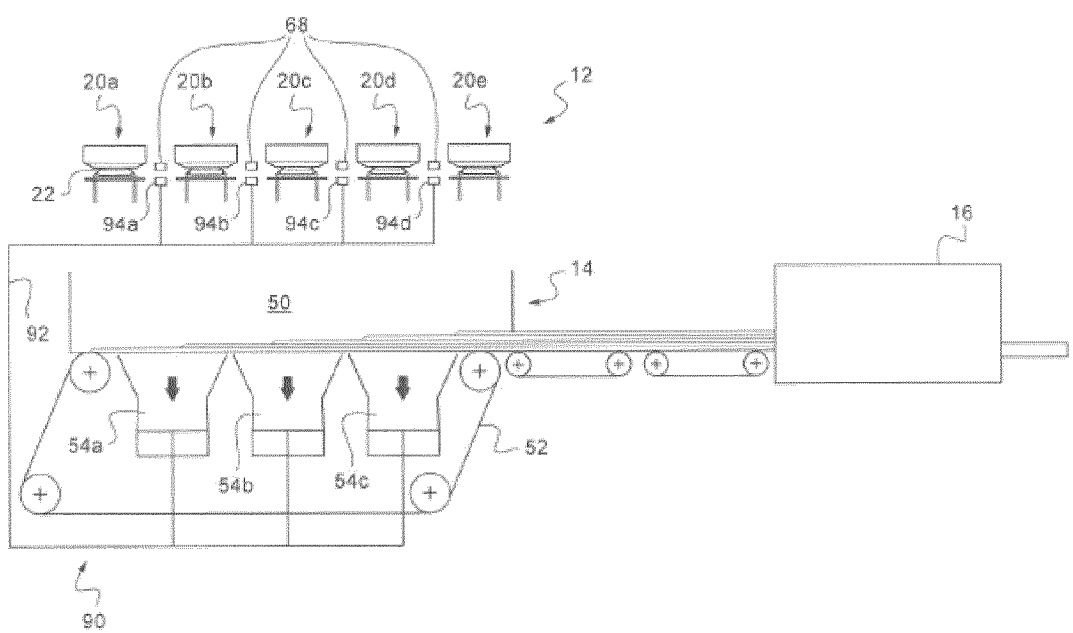

PROCESS FOR ADJUSTING THE AMOUNT OF DILUTION WATER OF A BINDING COMPOUND, AND CORRESPONDING COMPUTING UNIT

CROSS-REFERENCE TO RELATED APPLICATIONS

This application is the U.S. National Stage of PCT/EP2019/086377, filed Dec. 19, 2019, which in turn claims priority to French patent application number 1873729 filed Dec. 21, 2018. The content of these applications are incorporated herein by reference in their entireties.

The present invention relates to the manufacture of products based on mineral fibers, for example glass fibers, and in particular such products manufactured using a mat of fibers bound by a binder.

The invention relates, more specifically, to a process for manufacturing a mat of mineral fibers, and to a corresponding manufacturing plant.

Insulation products currently marketed typically consist of panels, boards, rolls or products of tubular or other shape obtained from a mat of mineral fibers, such as glass fibers, consolidated by an organic or mineral binder.

The process for manufacturing such a mat of fibers is well known and generally comprises the series of following steps:
the melting of the mineral material in a glass furnace,
the shaping into fibers,
the addition of a binding compound to the fibers,
the collecting of the fibers impregnated with the binding compound in a receiving chamber comprising, underneath and in the axis of the fiberizing device, a perforated conveyor or a grid, equipped in the lower part thereof with one or more suction ducts,
the conveying of the fibers on a receiving surface, in the form of a thicker or thinner layer referred to as a mat,
generally a crosslinking or polymerization heat treatment of the binding compound in a drying oven, said heat treatment being intended to give the mat its cohesion, and
a final preparation of the resulting products.

Within the context of the monitoring of the manufacturing process as has just been described, it is necessary to continuously carry out monitoring procedures, over at least a part and preferably over the whole of the production, in order to guarantee a good quality of the mat.

Patent application WO 2006/023137 describes for example a process for monitoring the process based on a measurement by spectroscopic means of the moisture present in the mat of fibers which is impregnated with binding compound, before heat treatment in the drying oven. By comparing the measured moisture content with a reference value, the adjustment of at least one parameter allows continuous control of the process. The process does not however make it possible to prevent moisture variations of the mat; it only corrects them.

It should be noted that the importance and the need for an effective monitoring process in the processes for manufacturing mats of mineral fibers are further increased currently due to the desire to develop, as a replacement for the phenol-formaldehyde resins used today, biobased alternative binders. With these biobased binders, even more than with the phenol-formaldehyde binders, the monitoring and the optimization of the amount of water and of the distribution therefore in the uncured product is essential for the control of the process in order to guarantee the desired quality of the final product.

Specifically, in order to reduce the viscosity of these alternative binders, it is necessary to substantially increase, compared to phenol-formaldehyde binders, the proportion of water present in the solution added to the fibers, which results in increased difficulties regarding the elimination of the residual water potentially present in the finished product on leaving the line, and thus makes the presence of precise monitoring means even more essential.

The objective of the invention is to provide a process for manufacturing a mat of mineral fibers that makes it possible to improve the quality of the heat treatment of the mat by more effectively monitoring the amount of water within the as yet uncured product.

This objective is achieved with a process for adjusting the amount of dilution water of a binding compound intended to be applied on fibers in a fiberizing station of a plant for manufacturing a mat of mineral fibers, the manufacturing plant comprising
a fiberizing station, comprising means for forming the fibers and means for applying on said fibers, a binding compound resulting from the mixture of a binder composition with dilution water,
a receiving chamber comprising a perforated receiving device, in particular a perforated conveyor or a grid, equipped with a fiber-receiving surface and, below said receiving surface, at least one suction duct,
means for heat treatment of the mat,
the process comprising at least the following steps:
determining the humidity of the ambient air in the fiberizing station,
determining the humidity of the intake air and the intake air flow rate in the at least one suction duct, and
determining an optimal amount of dilution water as a function at least of the humidity of the ambient air in the fiberizing station, of the humidity of the intake air and of the intake air flow rate in the at least one suction duct, and of the desired amount of water in the mat at the outlet of the receiving chamber,
adjusting the amount of dilution water as a function of said optimal amount thus determined.

In the present application, the intake air is defined as the air actually taken in by the suction duct(s), through the perforated conveyor or the grid of the receiving chamber.

Furthermore, the fiberizing station is defined as comprising all of the devices or members located upstream of the perforated conveyor or of the grid of the receiving chamber.

Lastly, the induced air is defined as the portion of the air taken in by the suction ducts that does not originate from the members of the fiberizing station, which include in particular members for heating or supplying air, water or other products (in particular the burner, the means for applying the binding compound, the blowing ring the air guns, the optional devices for supplying fragments of recycled product, the optional devices for supplying recycled intake air).

Subsequently, an amount can usually be interpreted as a mass flow, the manufacturing process being a continuous procedure (the mat being moving).

After a detailed study of the thermodynamic model from the fiberizing station to upstream of the drying oven, it was established that the induced air is one of the most determining parameters of the procedure for manufacturing the mat of fibers which is described above: the water contribution of this induced air is, among all the contributions to the moisture of the mat, the parameter which experiences the greatest variations. The induced air is therefore a dominant parameter to be controlled in order to maintain the moisture target of the mat.

The amount of induced air is impossible to quantify as is. The applicant has however established that the intake air is generally derived very predominantly from the induced air, often to more than 80%. The process that is the subject of the present invention uses this result, and also the possibility of measuring the amount of intake air, by calculating or approximating the amount of induced air. By knowing the humidity of the induced air, it is possible to know the influence thereof on the moisture of the mat. If this influence is too great, in other words if the induced air is highly loaded with water, this water will be found partly in the mat, and it will be possible to reduce the amount of water contained in the binding compound. If on the other hand the induced air results in too great an evaporation, it will be necessary to increase this amount.

The regulation of the amount of water in the binding compound, as a function of the water provided by the induced air, has the advantage of being precise, and of not requiring any major modification of the existing manufacturing plant.

It may be carried out by the simple adjustment of a single parameter, and ultimately makes it possible to improve the product yield by preventing rejects, and by limiting the adjustment operations on the line.

The process according to the invention is particularly suitable for the manufacture of a mat of glass fibers.

The binder used in the binding compound may be any organic binder commonly used in the field of insulation products based on glass wool.

It may be an insoluble and infusible thermoset binder obtained by polymerization and/or crosslinking of monomers, oligomers or polymers that are soluble or dispersible in water.

Mention may be made, as examples of such binders, of those
- based on phenol-formaldehyde resole resins, preferably modified by urea,
- based on Maillard reagents (reducing sugars and amines),
- based on acrylic polymers and crosslinking agents such as polyhydroxylated and polyamino reagents,
- based on non-reducing sugars and/or hydrogenated sugars and polycarboxylated reagents, such as citric acid,
- based on amino amides obtained by reaction of carboxylic anhydrides and alkanolamines.

The process is particularly suitable for mineral fibers bound by a thermosetting/thermoset binder, free of formaldehyde and/or based on biobased organic compounds (also referred to as "green binders").

It has been established that a target amount of water for the mat is preferably less than 15% by weight, more preferentially between 0.5% and 10% by weight, more preferentially still between 2% and 10% by weight. This amount may vary depending on the type of binder used in the mat. For example, the target amount of water for the mat comprising biobased organic binders is between 1% and 15% by weight, preferably between 2% and 10% by weight. For a mat comprising binders of phenol-formaldehyde resin type, this target amount of water is between 0.5% and 15% by weight and preferably between 1% and 5% by weight. For a mat comprising a binder based on acrylic polymer, the target amount of water is between 1% and 15% by weight, preferably between 2% and 10% by weight.

A fiberizing station typically comprises a plurality of members for heating or supplying air, water or other products, in particular at least one burner and/or means for applying the binding compound and/or at least one blowing ring and/or air guns and/or at least one device for supplying fragments of recycled product, in particular mat offcuts, and/or at least one device for supplying recycled intake air.

The contributions to the intake air that are in particular
- the air originating from the air ring(s),
- the air originating from the burner(s),
- the air originating from the means for applying the binding compound,
- the air originating from the air guns,
- the air originating from the possible device(s) for introducing edge fragments, which obviously contain a certain amount of water, are either disregarded or taken into account in the form of a constant in the determination of the optimal amount of dilution water. These contributions may be measured or calculated beforehand.

In certain particular cases in which a portion of the air taken in by the suction duct(s) is recycled in order to be reintroduced at the fiberizing station, it may be necessary to take into account, in the calculation of the amount of dilution water, the air originating from the possible device(s) for supplying recycled intake air. The amount of recycled intake air may in fact reach values ranging up to 50% of the amount of intake air, making the parameter significant.

According to one example, an amount of water, referred to as usable water, resulting from one or more of the members of the fiberizing station is taken into account in the determination of the optimal amount of dilution water. This amount of usable water may be measured beforehand by tests or determined by computation.

According to one example, the amount of usable water is at least equal to the sum of the amount of water resulting from the at least one burner and of the amount of water resulting from the binder composition. In other words, the amount of usable water is approximated by a value at least equal to this sum.

In the case where a portion of the air taken in by the suction duct(s) is recycled in order to be reintroduced at the fiberizing station, the amount of usable water can be at least equal to the sum of the amount of water resulting from the at least one burner, the amount of water resulting from the binder composition and the amount of water resulting from the at least one device for supplying recycled intake air. In other words, the amount of usable water can be approximated by a value at least equal to this sum.

According to one example, the adjustment of the amount of water in the binding compound is carried out continuously during the manufacture of the mat of mineral fibers. The dilution is thus adapted in real time as a function of the ambient humidity conditions, so that the variations in moisture in the mat are very small or even completely nonexistent, since they have been prevented at the source.

According to another example, the adjustment of the amount of water in the binding compound may also be carried out periodically, for example every hour, or after each change of product.

According to one exemplary embodiment, the intake air flow rate in said at least suction duct is maintained at a constant value.

According to another example, the intake air flow rate is measured, and the value thus measured is taken into account as a variable in the determination of the optimal amount of dilution water.

The intake air flow rate in the suction duct(s) may be obtained by directly measuring the speed of the air inside the or each suction duct, or a pressure differential directly linked to the speed of the air.

It is possible for example to use a pitot tube(s) system or an Annubar for a pressure measurement, and an anemometer or any other equivalent system for a speed measurement.

According to one example, in order to determine the humidity of the ambient air in the fiberizing station, measurements of humidity of the air are carried out at various locations of the fiberizing station and an average, optionally a weighted average, of the values thus measured is computed.

The invention also relates to a process for manufacturing a mat of mineral fibers, wherein
    in a fiberizing station, fibers are formed and a binding compound resulting from the mixture of a binder composition with dilution water is applied on said fibers,
    the fibers impregnated with the binding compound are collected in a receiving chamber comprising a perforated receiving device, in particular a perforated conveyor or a grid, equipped with a fiber-receiving surface and, below said surface, at least one suction duct,
    the mat is heat treated,
the process being characterized in that in addition:
    the humidity of the ambient air in the fiberizing station is determined,
    the humidity of the intake air and the intake air flow rate in the at least one suction duct are determined, and
    an optimal amount of dilution water is determined as a function at least of the humidity of the air in the fiberizing station, of the humidity of the intake air and of the intake air flow rate in the at least one suction duct, and of the target amount of water desired in the mat at the outlet of the receiving chamber,
    the amount of dilution water is adjusted as a function of said optimal amount thus determined.

It should be noted that all of the features mentioned above in connection with the monitoring process can also be applied to the manufacturing process.

The invention also relates to a unit for computing an amount of dilution water of a binding compound intended to be applied on fibers in a fiberizing station of a plant for manufacturing a mat of mineral fibers, the manufacturing plant comprising
    a fiberizing station, comprising means for forming the fibers and means for applying on said fibers, a binding compound resulting from the mixture of a binder composition with dilution water,
    a receiving chamber comprising a perforated receiving device, in particular a perforated conveyor or a grid, equipped with a fiber-receiving surface and, below said receiving surface, at least one suction duct,
    means for heat treatment of the mat,
the computing unit further comprising:
    means for determining the humidity of the ambient air in the fiberizing station,
    means for determining the humidity of the intake air and means for determining the intake air flow rate in the at least one suction duct,
    means for computing the optimal amount of dilution water as a function of the humidity of the ambient air in the fiberizing station, of the humidity of the intake air and of the intake airflow rate in the at least one suction duct, and of the desired amount of water in the mat at the outlet of the receiving chamber, and
    means for adjusting the amount of dilution water as a function of said optimal amount determined by said computing means.

The invention relates finally to a plant for manufacturing a mat of mineral fibers, comprising
    a fiberizing station, comprising means for forming the fibers and means for applying on said fibers, a binding compound resulting from the mixture of a binder composition with dilution water,
    a receiving chamber comprising a perforated receiving device, in particular a perforated conveyor or a grid, equipped with a fiber-receiving surface and, below said receiving surface, at least one suction duct,
    means for heat treatment of the mat,
the plant being characterized in that it further comprises:
    means for determining the humidity of the ambient air in the fiberizing station,
    means for determining the humidity of the intake air and means for determining the intake air flow rate in the at least one suction duct,
    means for computing the optimal amount of dilution water as a function of the humidity of the ambient air in the fiberizing station, of the humidity of the intake air and of the intake air flow rate in the at least one suction duct, and of the desired amount of water in the mat at the outlet of the receiving chamber, and
    means for adjusting the amount of dilution water as a function of said optimal amount determined by said computing means.

Several embodiments or exemplary embodiments are described in the present document. However, unless otherwise specified, the features described in connection with any one embodiment or exemplary embodiment may be applied to another embodiment or exemplary embodiment.

The invention will be better understood and the advantages thereof will become more clearly apparent on reading the detailed description which follows of several embodiments represented as nonlimiting examples.

The description refers to the appended drawings, in which:

FIG. 1 is a schematic view of a plant for manufacturing a mat of mineral fibers, according to a first exemplary embodiment of the invention, FIG. 2A is a cross-sectional view along II of FIG. 1, FIG. 2B is a detailed view of the part IIB of FIG. 2A, FIG. 3 is a schematic view of a plant for manufacturing a mat of mineral fibers, according to a second exemplary embodiment of the invention.

FIG. 1 is a schematic view of a plant 10 for manufacturing a mat M of glass fibers according to a first exemplary embodiment, comprising, in the order of the manufacturing procedure, a fiberizing station 12, a forming station 14 and a drying oven 16.

The fiberizing station 12 comprises at least one fiberizing device 20, preferably a plurality of such devices 20a, . . . , 20n arranged in series, as illustrated in FIG. 1.

Such a fiberizing device 20 is illustrated in greater detail in FIGS. 2A and 2B.

To manufacture the fibers, the device 20 comprises a spinner 22, also known as a fiberizing spinner, capable of rotating at high speed about an axis A, which is in particular vertical, and comprising an annular wall 24 pierced by a plurality of orifices 26 and optionally a base. A molten glass stream, introduced into the spinner 22, is projected by the plurality of orifices 26 under the effect of the centrifugal force, creating a plurality of filaments.

Each fiberizing device 20 also comprises at least one annular burner 30 generating a high-temperature attenuating gas jet 32, substantially tangential to the annular wall 24 of the spinner 22, intended to heat and thin said filaments leaving the spinner, thus transforming them into fibers F.

Optionally, the fiberizing device 20 may also comprise a device for heating the lower part of the spinner in the form of a magnetic induction ring 34.

Each fiberizing device 20 further comprises a blowing ring or air ring 36 positioned below the burner 30, and intended to prevent a dispersion of the fibers too far from the axis of rotation A of the spinner 22.

Each fiberizing device 20 lastly comprises a device 40 for applying a binding compound on the fibers F. This application device 40 is typically in the form of an annular ring 42 bearing spray nozzles 44 and inside which ring the glass fibers F successively pass. The ring 42 is connected to a binding compound tank 46 and each spray nozzle 44 associated with this ring is configured to receive, on the one hand, an amount of the binding compound and, on the other hand, an amount of compressed air via an independent supply (not represented) in order to project the binding compound as the glass fibers pass by.

In the binding compound tank 46, a binder composition is mixed with a greater or lesser amount of dilution water resulting from a water tank 47 connected to the binding compound tank 46 via a water supply line 48 provided with adjustment means, typically a control valve 49.

The binder composition is an aqueous solution, the solids content of which is constant, typically of the order of 15% by weight. Its solids consist of chemical precursors intended to react via polymerization within the context of a heat treatment in the drying oven 16.

The amount of dilution water, for its part, is a parameter that can be adjusted by virtue of the adjustment means 49, thus making it possible to regulate the water content of the binding compound ultimately applied on the fibers F.

Optionally, the fiberizing device 20 may further comprise, downstream of the device 40 for applying the binding compound, air nozzles 38—also known as air guns—here represented schematically by arrows, that make it possible to distribute the fibers F. The distribution of the fibers F is adjusted if need be by modifying the orientation of the nozzles and the pressure of the air which results therefrom.

The glass fibers F of each fiberizing device 20 thus fall until they arrive at the forming station 14. There, they are collected in the form of a mat M in a receiving chamber 50, on a perforated conveyor 52. As illustrated in the figures, one or more suction ducts 54 (three ducts respectively 54a, 54b, 54c in the example represented in FIG. 1) are intended to create and maintain a negative pressure below the receiving surface 52a of the conveyor 52 receiving the mat M. For this, each suction duct 54 opens, via its "upstream" end, below the receiving surface 52a of the conveyor 52, and is connected to one or more extraction fans 56 (visible in FIG. 2A) generating the suction force. The air thus taken in is referred to as forming air or intake air.

The receiving chamber 50 is typically delimited by four walls, which are orthogonal in pairs: two front and rear fixed walls 58, 60, transverse to the transportation direction of the conveyor, and two lateral walls 62, 64—also known as hood walls—consisting of moving endless belts, of which the outer portions 62a, 64a are continuously cleaned by water. The inner surfaces 62b, 64b of the hood walls recover the dust and binder inside the receiving chamber 50. This dust is discharged during the cleaning of said surface to the outside when they pass to the outside via rotation.

It should be noted that, as a variant, the four walls of the receiving chamber may be formed of moving endless belts as defined above.

The mat M is then sent in the direction of the drying oven 16 forming a crosslinking station, in which it is simultaneously dried out and subjected to a specific heat treatment which gives rise to the polymerization (or "curing") of the resin of the binder present at the surface of the fibers.

The mat M of mineral fibers is then subjected to
- a longitudinal cutting of its uneven edges, in the length direction, generally by means of saws, and
- a cutting in a transverse direction and optionally in the thickness direction (splitting), so as to obtain blocks that will then be able to be arranged either as sheets or as rolls, generally by means of a saw or of a guillotine, in order to form for example thermal and/or sound insulation panels or rolls.

In certain manufacturing plants, the uneven edges of the panels are recovered, ground, then reintroduced upstream into the process. The fiberizing station 12 may then, in addition to the foregoing, comprise one or more devices 68 for supplying fragments of recycled product: each device 68 for supplying fragments of recycled product is located for example between two fiberizing devices 20, preferably between two spinners 22, as illustrated in FIG. 3.

According to the invention, the manufacturing process comprises a step of computing the optimal amount of dilution water as a function of several parameters measured at different levels of the process and—for other parameters—computed or set beforehand.

This computation is carried out by a unit 70 for computing the optimal amount of dilution water, which unit 70 is connected to a plurality of measurement devices described subsequently, by means of which the following are determined:
- the humidity of the ambient air in the fiberizing station,
- the humidity of the intake air in the at least one suction duct, and
- the intake air flow rate in the at least one suction duct.

By using these measured data and other parameters of the process that are computed or set beforehand, the computing unit determines the optimal amount of dilution water by using an equation of the type:

[Math1]

$$D_d = D_m + D_{aa} * (H_{aa} - H_{ai}) + C_a * H_{ai} - C_e \quad (1)$$

where $D_d$ is the mass flow rate of water to be added to the binding compound (in kg/h)

$D_m$ is the target mass flow rate of water desired in the moving mat at the outlet of the receiving chamber and upstream of the drying oven (in kg/h)

$D_{aa}$ is the mass flow rate of air taken in by the at least one suction duct (in kg/h)

$H_{aa}$ is the absolute humidity of the air in the at least one suction duct (kg of water/kg of dry air)

$H_{ai}$ is the average absolute humidity of the air in the fiberizing station (kg of water/kg of dry air)

$C_a$ is a value representative of the amount of air resulting from the members of the fiberizing station $C_e$ is a value representative of the amount of water resulting from the members of the fiberizing station The absolute humidity of the ambient air in the fiberizing station 12 may be obtained by computation from the relative humidity and from the temperature of the air, measured using at least one relative humidity measuring device 72 and at least one temperature measuring device 74, which are positioned in a zone representative of the general hygrometry and temperature conditions of the fiberizing station.

As the hygrometry and the temperature may vary locally, the plant preferably comprises, at the fiberizing station 12, a plurality of relative humidity measuring devices 72a, ..., 72n, and also a plurality of temperature measuring devices 74a, ..., 74n, positioned respectively in various zones referred to as test zones. All of these humidity and temperature measuring devices are connected to the unit 70 for computing the optimal amount of dilution water, which, on the basis of the measurements thus obtained, computes an average of the humidity and temperature values, and deduces therefrom an average absolute humidity that can be used in the aforementioned equation as $H_{ai}$.

The test zones are for example determined beforehand by producing a map of the hygrometry of the induced air using hygrometric probes distributed over the whole of the fiberizing station. These probes make it possible to detect the air flows and the differences in hygrometry, and to thus define the zones that have to be taken into account for the determination of the average ambient humidity.

The target mass flow rate of water desired in the mat $D_m$ (in kg/h) is determined by tests and depends on the required characteristics of the cured mat: it depends in particular on the density of the fibers F, on the formula of the binder composition, and on the amount of binder.

The mass flow rate of air taken in by the at least one suction duct $D_{aa}$ (in kg/h) is easily measurable and adjustable.

A device 76 for measuring the flow rate inside the duct 54b is here represented schematically in FIG. 2A. Advantageously, when a variation in flow rate is detected by the measuring device 76, the control device 80 accordingly adjusts the speed of the extraction fan(s) 56 to bring the flow rate back to its nominal/desired value. The intake air flow rate in said at least suction duct 54 is thus maintained at a constant value.

The measuring device 76 may communicate directly with the unit 70 for computing the optimal amount of dilution water (communication not represented in FIG. 2A).

According to another implementation example, the intake air flow rate may be measured as indicated previously, and the value thus measured may be taken into account as a variable in the determination of the optimal amount of dilution water. In this precise case, a direct communication between the measuring device 76 and the computing unit 70 is particularly advantageous.

The absolute humidity of the air $H_{aa}$ in the at least one suction duct 54b is, itself, measured or obtained by any suitable means (or combination of means) provided inside the duct, referenced 78 in FIG. 2A, it too in communication with the computing unit 70.

The value $C_e$ is preferably approximated by a value at least equal to the sum of the amount of water resulting from the burner 30 and of the amount of water resulting from the binder composition, which can be calculated by knowing respectively the flow rate and the composition of the air incinerated, and the flow rate of binder composition defined by adjustment and the water content of the binder composition.

More preferentially still, the value $C_e$ is approximated by a value equal to the sum of the amount of water resulting from the burner 30 and from the binder composition, but also of the amount of water resulting from the air ring 36 and/or from the air guns 38 and/or from the device 40 for applying the binding compound and/or from the possible device(s) 68 for introducing edge fragments.

The value $C_a$ is preferably approximated by a value at least equal to the sum of the amount of air resulting from the air guns 38 and from the possible device(s) 68 for introducing edge fragments.

More preferentially still, the value $C_a$ is approximated by a value equal to the sum of the amount of air resulting from the air guns 38 and from the possible device(s) 68 for introducing edge fragments, but also of the amount of air resulting from the burner 30 and from the air ring 36.

Once the optimal amount of dilution water has been computed by the computing unit 70, this amount is compared to the actual amount of dilution water at the moment considered and, if need be, the computing unit 70 controls means for adjusting the amount of dilution water so that it reaches said optimal value, here the control valve 49.

FIG. 3 is a schematic view of a plant for manufacturing a mat of mineral fibers, according to a second implementation example of the invention.

This plant differs from that described in connection with FIGS. 1 and 2 in that it comprises a circuit 90 for recirculating a portion of the intake air to the fiberizing station 12, where this air is reintroduced. As illustrated in FIG. 3, a recirculation line 92 connects each suction duct 54a, 54b, 54c to devices 94a, ..., 94d for supplying recycled intake air which are each positioned between two fiberizing devices 20.

The recycled air flow rate represents for example X=20% to 70% of the intake air flow rate.

The determination of the optimal amount of dilution water is in this case carried out by using an equation of the type:

[Math2]

$$D_d = D_m + D_{aa}*(H_{aa} - H_{ai} - X*H_{ar}) + C_a*H_{ai} - C_e \qquad (2)$$

where $D_d$ is the mass flow rate of water to be added to the binding compound (in kg/h)

$D_m$ is the target mass flow rate of water desired in the moving mat at the outlet of the receiving chamber and upstream of the drying oven (in kg/h)

$D_{aa}$ is the mass flow rate of air taken in by the at least one suction duct (in kg/h)

$H_{aa}$ is the absolute humidity of the intake air in the at least one suction duct (kg of water/kg of dry air)

$H_{ai}$ is the average absolute humidity of the air in the fiberizing station (kg of water/kg of dry air)

$H_{ar}$ is the absolute humidity of the recycled air (kg of water/kg of dry air)

X is the recycled air mass flow rate/intake air mass flow rate ratio $C_a$ is a value representative of the amount of air resulting from the members of the fiberizing station $C_e$ is a value representative of the amount of water resulting from the members of the fiberizing station.

It should be noted that the absolute humidity of the recycled air $H_{ar}$ may—or may not—be equal to the absolute humidity of the intake air $H_{aa}$.

Preferably, the hygrometry of the recycled air inside the recirculation line 92 is measured by means of at least one relative humidity measuring device and of a temperature measuring device (which are not represented), each connected to the unit 70 for computing the optimal amount of dilution water.

The invention claimed is:

1. A process for adjusting an amount of dilution water of a binding compound intended to be applied on fibers in a fiberizing station of a plant for manufacturing a mat of mineral fibers, the manufacturing plant comprising
   a fiberizing station, comprising means for forming the fibers and means for applying, on said fibers, a binding compound resulting from the mixture of a binder composition with dilution water,
   a receiving chamber comprising a perforated receiving device equipped with a fiber-receiving surface and, below said fiber-receiving surface, at least one suction duct, means for heat treatment of the mat,
   the process comprising:
   determining humidity of ambient air in the fiberizing station,
   determining humidity of intake air and intake air flow rate in the at least one suction duct,
   determining an optimal amount of dilution water as a function at least of the humidity of the ambient air in the fiberizing station, of the humidity of the intake air and of the intake air flow rate in the at least one suction duct, and of a desired amount of water in the mat at an outlet of the receiving chamber, and
   adjusting the amount of dilution water as a function of said optimal amount thus determined.

2. The process as claimed in claim 1, wherein the fiberizing station comprises a plurality of heating members and/or a plurality of members for supplying air or water, and the optimal amount of dilution water is determined by further taking into account the amount of usable water, resulting from one or more of said plurality of members.

3. The process as claimed in claim 2, wherein the amount of usable water is at least equal to the sum of the amount of water resulting from at least one burner and of the amount of water resulting from the binder composition.

4. The process as claimed in claim 2, wherein the amount of usable water is at least equal to the sum of the amount of water resulting from at least one burner, the amount of water resulting from the binder composition and the amount of water resulting from at least one device for supplying recycled intake air.

5. The process as claimed in claim 2, wherein the plurality of members include at least one burner and/or means for applying the binding compound and/or at least one blowing ring and/or air guns and/or at least one device for supplying recycled intake air.

6. The process as claimed in claim 2, wherein the amount of usable water, resulting from one or more of said plurality of members is measured beforehand by tests or determined by computation.

7. The process as claimed in claim 1, wherein the fiberizing station comprises a plurality of heating members and/or a plurality of members for supplying air or water, and the optimal amount of dilution water is determined by further taking into account an amount of usable air, resulting from one or more of said plurality of members.

8. The process as claimed in claim 7, wherein the plurality of members include at least one burner and/or means for applying the binding compound and/or at least one blowing ring and/or air guns and/or at least one device for supplying recycled intake air.

9. The process as claimed in claim 7, wherein the amount of usable air, resulting from one or more of said plurality of members is measured beforehand by tests or determined by computation.

10. The process as claimed in claim 1, wherein the intake air flow rate in said at least one suction duct is maintained at a constant value.

11. The process as claimed in claim 1, wherein, in order to determine the humidity of the ambient air in the fiberizing station, measurements of humidity of the air are carried out at various locations of the fiberizing station and an average of the values thus measured is computed.

12. The process as claimed in claim 1, wherein the adjustment of the amount of dilution water in the binding compound is carried out continuously during the manufacture of the mat of mineral fibers.

13. The process as claimed in claim 1, wherein the adjustment of the amount of water in the binding compound is carried out periodically or after each change of product.

14. The process as claimed in claim 13, wherein the adjustment of the amount of water in the binding compound is carried out every hour.

15. The process as claimed in claim 1, wherein the perforated receiving device is a perforated conveyor or a grid.

16. A process for manufacturing a mat of mineral fibers, comprising: in a fiberizing station, forming fibers and applying a binding compound resulting from a mixture of a binder composition with dilution water on said fibers, collecting the fibers impregnated with the binding compound in a receiving chamber comprising a perforated receiving device equipped with a fiber-receiving surface and, below said fiber-receiving surface, at least one suction duct, heat treating the mat, and adjusting an amount of dilution water of a binding compound as claimed in the process of claim 1.

17. The process as claimed in claim 16, wherein the perforated receiving device is a perforated conveyor or a grid.

* * * * *